United States Patent [19]

Morris

[11] 4,414,820

[45] Nov. 15, 1983

[54] ELECTRICAL CIRCUIT AND METHOD OF CONTROLLING SUCH

[75] Inventor: George E. Morris, Sterling, Ill.

[73] Assignee: General Electric Company, Fort Wayne, Ind.

[21] Appl. No.: 349,377

[22] Filed: Feb. 16, 1982

[51] Int. Cl.³ .............................................. F25B 27/00
[52] U.S. Cl. .................................... 62/226; 62/228.3; 62/323.4
[58] Field of Search ...................... 62/228 D, 226, 215, 62/323.4; 200/81 R, 81.4, 83 N, 83 L, 83 R; 340/614, 626; 310/94; 236/75, 78 R, 78 A; 361/194, 154, 160, 178; 307/118, 132 EA, 113, 115

[56] References Cited

U.S. PATENT DOCUMENTS

| | | |
|---|---|---|
| 3,786,210 | 1/1974 | Byam .................................. 200/81.4 |
| 4,256,973 | 3/1981 | Kochanski et al. .................. 307/118 |
| 4,263,928 | 4/1981 | Kobayashi et al. ............. 361/154 X |
| 4,355,523 | 10/1982 | Shimada ......................... 62/323.4 X |
| 4,356,705 | 11/1982 | Sutoh et al. ............................ 62/229 |

Primary Examiner—Albert J. Makay
Assistant Examiner—Harry Tanner
Attorney, Agent, or Firm—Joseph E. Papin

[57] ABSTRACT

An electrical circuit for an automotive type air conditioning system. The circuit has a pair of switch elements sequentially operable to place a resistor in circuit relation with a relay to effect its actuation, and the relay controls the energization of a coil of a clutch device for coupling it in driving relation with a refrigerant compressor operable in the system.

A method of controlling an electrical circuit is also disclosed.

14 Claims, 5 Drawing Figures

ELECTRICAL CIRCUIT AND METHOD OF CONTROLLING SUCH

CROSS-REFERENCE TO RELATED APPLICATION

This application is related to the George E. Morris and Stewart A. Woodward application Ser. No. 349,330 filed Feb. 16, 1982 entitled "Control Device And Method Of Making", the Thomas W. Brown application Ser. No. 349,378 filed Feb. 16, 1982 entitled "Electrical Circuit And Method Of Operating Such", and the Donald L. Haag application Ser. No. 349,329 filed Feb. 16, 1982 entitled "Control Device, Method of Operating And Method of Manufacturing", and each of the aforementioned related applications concurrently filed with this application is incorporated herein by reference.

FIELD OF THE INVENTION

This invention relates generally to automotive type air conditioning systems and in particular to an electrical circuit therefor and a method of operating an electrical circuit.

BACKGROUND OF THE INVENTION

In the past, various different types of electrical circuits were utilized for controlling the operation of an automotive type air conditioning system. For instance, some of the past electrical circuits had a control device with a snap-acting switch operable therein in response to a preselected low fluid pressure of refrigerant at a low fluid pressure or suction side of a compressor in the air conditioning system to selectively energize a coil of a clutch device thereby to couple it in driving relation with a refrigerant compressor in the system. When so driven, the compressor was operable to compress the refrigerant so as to vaporize it at a high fluid pressure and temperature, and such vaporized refrigerant was circulated in the system to a condenser. Upon passing through the condenser, the vaporized refrigerant was, of course, cooled and condensed back to its liquid state at a high fluid pressure, and from the condenser, the liquid refrigerant was orificed or passed through an expansion valve or tube. Of course, upon the orificing or expansion of the cool high fluid pressure liquid refrigerant through the expansion valve, the refrigerant experiences a pressure drop and again changes state to a low pressure vapor, and in this cooler low fluid pressure vaporized state, the refrigerant passes through an evaporator and back to the suction side of the compressor. Thus, when the fluid pressure of the refrigerant at the suction side of the compressor attains a preselected high value, the snap-acting switch of the control device is operable in response thereto to effect the deenergization of the clutch device coil thereby to uncouple the clutch device from its driving relation with the compressor interrupting its operation in the system.

One of the disadvantageous or undesirable features of this past electrical circuit discussed above was believed to be that the snap-acting switch operable in such circuit created an objectionable noise or clicking sound which is audible in the passenger compartment of the vehicle in which the air conditioning system was employed. Another disadvantageous or undesirable feature of the electrical circuit discussed above is believed to be that undesirable chatter of the clutch device may have been engendered which, of course, might result in undue wear of the clutch device and perhaps premature failure thereof.

In other of the past electrical circuits for controlling the operation of an automotive type air conditioning system, such as illustrated in U.S. Pat. No. 4,256,973 for instance, a pair of creep type switches were utilized in conjunction with solid state circuitry to control the operation of the refrigerant compressor in the system; however, it is believed that a disadvantageous or undesirable feature of this patented circuit involved the complexity thereof as well as the cost of the solid state circuitry.

SUMMARY OF THE INVENTION

Among the several objects of the present invention may be noted the provision of an improved electrical circuit for an automotive type air conditioning system and an improved method of controlling an electrical circuit to effect the operation of a refrigerant compressor in an automotive type air conditioning system which overcome the aforementioned disadvantageous or undesirable features, as well as others, of the prior art; the provision of such improved circuit and method in which a pair of switch means are operable to effect the energization or deenergization of a relay device for controlling the coupling relation of a clutch device with a refrigerant compressor of the air conditioning system, such switch means being incapable of effecting both the energization and deenergization of the relay device; the provision of a resistor having a preselected resistor value for obviating the pick up energization and the dropout deenergization of the relay device until the switching means are operated in a preselected sequence; and the provision of such improved circuit and method in which the component parts are simplistic in design, easily assembled and connected, and economically manufactured. These as well as other objects and features of the present invention will be in part apparent and in part pointed out hereinafter.

In general, an electrical circuit in one form of the invention for controlling a refrigerant compressor in an automotive type air conditioning system has means selectively energized in the circuit for coupling in driving relation with the compressor to effect its operation in the system, and a relay device is picked up at a preselected pickup voltage in the circuit and dropped out at a preselected dropout voltage for controlling the energization of the coupling means. A pair of means connected in parallel with each other and in series with the relay device are operable generally sequentially for switching between a pair of conductivity modes, respectively, and the relay means is picked up at the preselected pickup voltage thereof so as to effect the energization of the coupling means and its driving relation with said compressor only when both of the switching means are sequentially operated to one of the conductivity modes thereof. Resistor means for connection in the circuit in series with said relay device and one of said switching means in its one conductivity mode has a preselected resistance effective to obviate the pickup of the relay device at the preselected pickup voltage thereof until the other of the switching means is sequentially operated to its one conductivity mode subsequent to the one switching means.

Also in general and in one form of the invention, a method of controlling an electrical circuit is provided to effect the operation of a refrigerant compressor associated with a clutch device adapted for coupling in driving relation therewith in an automotive type air conditioning system. The circuit includes a power source, a pair of switch means for operation between a pair of switching modes thereof, respectively, a resistor having a preselected resistance value, a relay device having a preselected pickup voltage and a preselected dropout voltage, and coil means energizable for actuating the clutch device. In this method, the switch means are sequentially operated to one of the switching modes thereof, respectively, and the resistor is connected in circuit relation with the relay device across the power source upon the operation of one of the switch means to its one switching mode with the preselected resistance value of the resistor being effective to maintain the voltage drop across the relay device to a value less than the preselected pickup voltage of the relay device until the sequential operation of the other of the switch means to its one switching mode. The relay device is actuated generally at the pickup voltage thereof in response to the operation of the other switch means to its one switching mode, and the coil means is energized to effect the coupling of the clutch device in the driving relation thereof with the compressor and initiate its operation in the system.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

Figure 1:
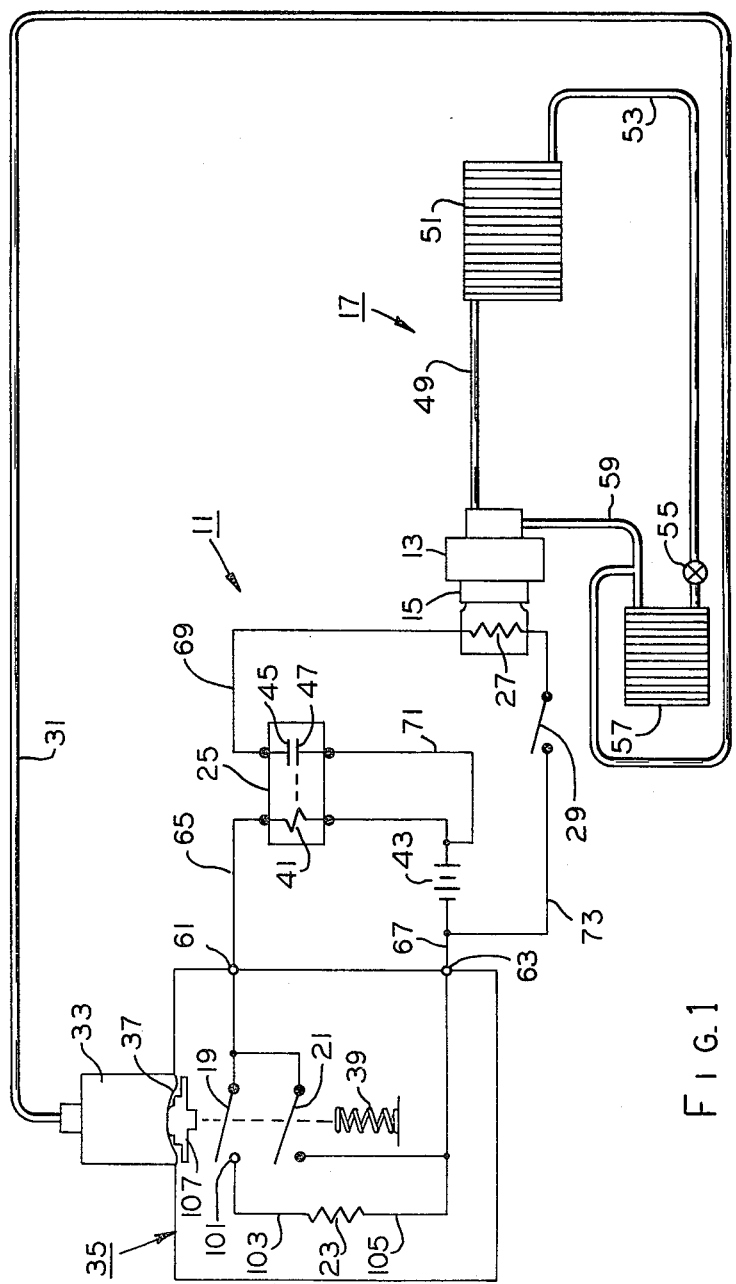
FIG. 1 is a schematic diagram showing an electrical circuit in one form of the invention for controlling a refrigerant compressor in an exemplary automotive type air conditioning system and illustrating principles which may be practiced in a method of controlling the electrical circuit also in one form of the invention.
Figure 2:
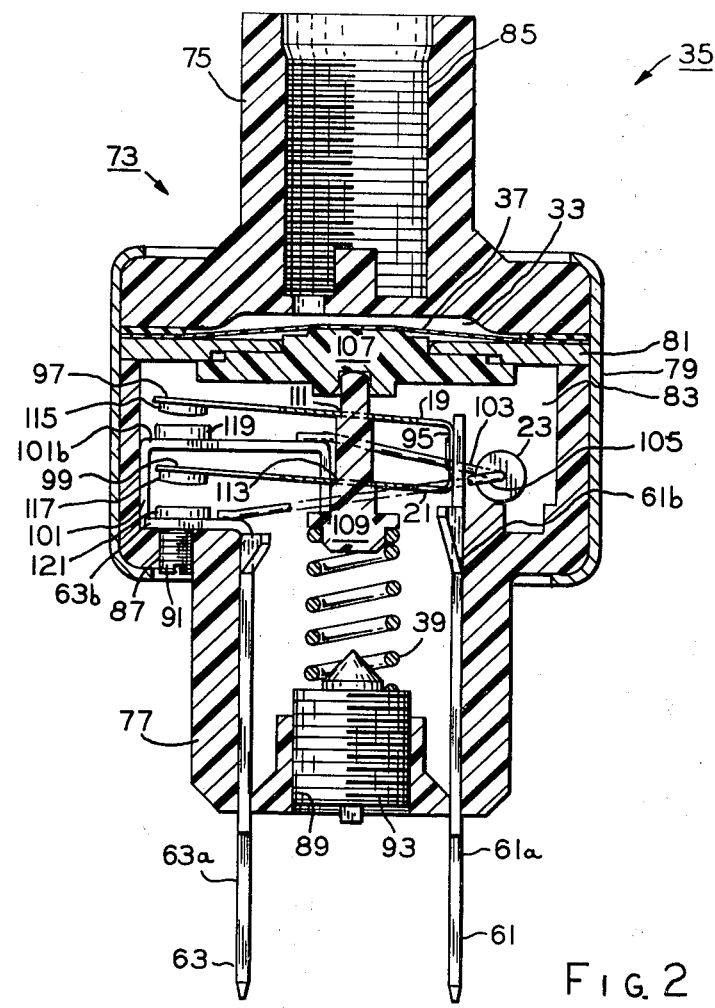
FIG. 2 is a sectional view of an exemplary control device illustrated in the electrical circuit of FIG. 1.
Figure 3:
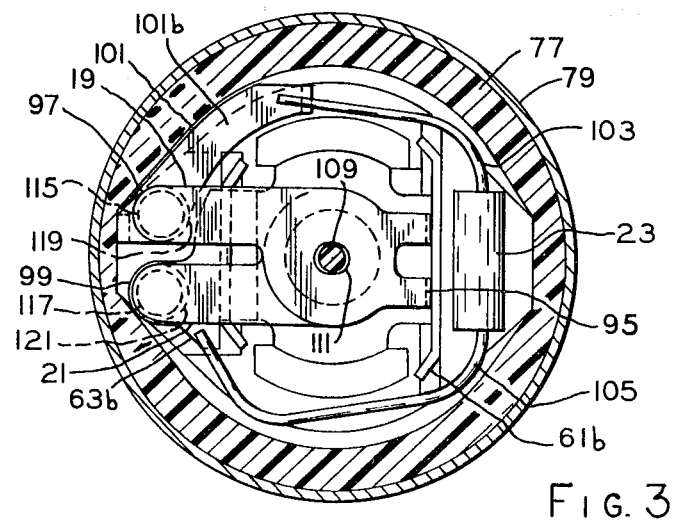
FIG. 3 is a sectional view taken along line 3—3 in FIG. 2.

With reference to the drawings in general, there is illustrated in one form of the invention a method of controlling an electrical or control circuit 11 to effect the operation of a refrigerant compressor 13 associated with a clutch device 15 adapted for coupling in driving relation therewith in an exemplary automotive type air conditioning system 17 (FIG. 1). Electrical circuit 11 includes a pair of means, such as switch elements 19, 21 for instance, for switching between a pair of switching or conductivity modes thereof, respectively, a resistor 23, a relay device 25, and coil means 27 energizable for actuating clutch device 15 (FIGS. 1–3). In this method, the fluid pressure of refrigerant in system 17 is monitored or otherwise sensed. Sequential operation of switching means or switch elements 19, 21 is effected to one of the conductivity modes thereof in response to the monitored refrigerant fluid pressure of different preselected values, respectively, and resistor 23 is placed or otherwise connected in circuit relation with relay device 25 upon the operation of switch element 19 to its one conductivity mode to obviate the actuation of the relay device until switch element 21 is sequentially operated to its one conductivity mode (FIGS. 1 and 2). Coil means 27 is energized upon the actuation of relay device 25 when switch element 21 is sequentially operated to its one conductivity mode, and in response to the energization of the coil means, clutch 15 is coupled in the driving relation thereof with compressor 13 so as to initiate its operation in system 17 (FIG. 1).

More particularly and with specific references to FIGS. 1–3, the monitored or refrigerant fluid pressure developed or established in system 17 at suction side of compressor 13 is a direct function of the ambient or atmospheric temperature in which the system functions. When the vehicle operator desires to enable circuit 11 to place system 17 in the cooling mode thereof, the operator closes an enabling switch 29, and assuming that the atmospheric temperature is high enough to effect the establishment of a preselected low fluid pressure, say for instance approximately 20 psig, such preselected low fluid pressure is transmitted through a conduit 31 from the suction side of compressor 13 in system 17 to a refrigerant or fluid pressure chamber 33 in a control device, such as a pressure cyling switch 35 or the like for instance. The preselected low fluid pressure so established in chamber 33 of control device 35 acts on the effective area of a diaphragm 37 therein to create a control force which is initially effective to conjointly move the diaphragm and switch element 19 associated the control device thereby to translate switch element 19 to a closed position or switching mode prior to the operation of switch element 21. In this manner, the sensing or monitoring of the refrigerant fluid pressure at the low fluid pressure side of compressor 13 in system 17 by control device 35 results in the closing of switch element 19 in circuit 11 prior to the operation of switch element 21 therein when the sensed or monitored refrigerant fluid pressure attains the preselected low value thereof.

It may be noted that resistor 23 has a preselected resistance value which is chosen or selected so as to match or be operatively compatible with a preselected pickup voltagr and a preselected dropout voltage of a coil or coil means 41 in relay device 25. Thus, upon the closing of switch element 19 as discussed above, it may also be noted that resistor 23 is placed or otherwise connected in series circuit relation with relay coil 41 across a power source, such as a battery 43 or the like for instance, in circuit 11, and the preselected resistance value of the resistor is effective to maintain the voltage drop across the relay coil to a value less than the preselected pickup voltage thereof. In other words, the preselected resistance value of resistor 23 is such that when switch element 19 is closed while switch element 21 is open, the voltage drop across relay coil 41 is greater than the aforementioned preselected dropout voltage thereof but less than its pickup voltage, and therefore, such closure of switch element 19 effects the energization of the relay coil but will not pickup the relay coil across battery 43.

Assume further that the atmospheric temperature to which system 17 is subjected is great enough not only to effect the establishment of the preselected low value of the refrigerant fluid pressure at the low fluid pressure side of compressor 13 in the system but also to effect the establishment of a preselected high value thereof, such as for instance approximately 40 psig. When diaphragm 37 in chamber 33 of control device 35 is subjected to this increased preselected high value of the refrigerant fluid pressure at the suction side of compressor 13 in system 17, the control force exerted by the diaphragm is correspondingly increased, and the increased control force is effective to conjointly move the diaphragm and switch element 21 associated therewith against the compressive force of spring 39 to translate switch element 21 to its closed position or switching mode subsequent to the aforementioned operation of switch element 19 to its closed position. In response to this sequential or subsequent closure of switch element 21 with switch element 19 closed, as discussed above, resistor 23 is placed or otherwise connected in shunt circuit relation with relay coil 41 across battery 43, and the relay coil is directly connected in circuit relation across battery 43 through closed switch element 21, which, of course, results in the energization or pickup of the relay coil in circuit 11. Thus, it may be noted that switch element 19 is arranged in series circuit relation with both resistor 23 and relay coil 41 across battery 43, and switch element 21 is arranged in shunt or parallel circuit relation with the resistor and switch element 19 while being connected in series circuit relation with the relay coil across the battery. In view of this circuit configuration, upon the sequential closure of switch element 21 when switch element 19 is closed, resistor 23 remains energized but is shunted so that its preselected resistance value no longer has an effect on the voltage drop across relay coil 41. Thus, relay coil 41 is picked up upon the closure of switch element 21 and acts to effect the closure of a set of contacts 45, 47 associated therewith in relay device 25, and upon the closure of relay contacts 45, 47, coil 27 in clutch device 15 is energized across battery 43. The energization of clutch coil 27 is effective to actuate or couple clutch device 15 in its driving relation with compressor 13 to initiate its operation in system 17.

When compressor 13 is so operated or driven in system 17, refrigerant in the vapor stage thereof is drawn from the suction side of the compressor and compressed by the compressor and discharged therefrom as a hot high pressure vapor through a conduit 49 to a condenser 51. Upon passage through condenser 51, the hot high pressure vaporized refrigerant is cooled and condensed thereby to effect a change of state in the refrigerant which is discharged from the condenser as a cold high pressure liquid through a conduit 53. An expansion or orifice tube or valve 55 is disposed in conduit 53 between condenser 51 and an evaporator 57, and as the cold high pressure liquid refrigerant is passed or orificed through the expansion valve, a pressure drop occurs which again effects a change in state of the refrigerant so that the refrigerant enters the evaporator as a cold low pressure vapor. Of course, from evaporator 57, the cold low pressure vaporized refrigerant is delivered through a conduit 59 back to the suction side of compressor 13 for recycling through system 17, and conduit 59 also intersects in pressure fluid contact with conduit 31 leading to chamber 33 of control device 35 so as to effect the monitoring of the refrigerant fluid pressure at the suction side of compressor 13. Although exemplary system 17 and its component parts are illustrated herein for purposes of disclosure, it is contemplated that other similar automotive type air conditioning systems may be utilized and may employ different and/or additional component parts within the scope of the invention so as to meet at least some of the objects thereof.

As is well known to the art, the fluid pressure of the refrigerant returned from evaporator 57 through conduit 53 to the suction side of compressor 13 is reduced in comparison with that present when switch elements 19, 21 were moved to their closed positions, as previously discussed hereinabove. When this reduction of the refrigerant fluid pressure at the suction side of compressor 13 in system 17 occurs, such reduced refrigerant fluid pressure transmitted via conduit 31 to chamber 33 of control device 35 effects a corresponding reduction in the control force exerted by diaphragm 37 thereof. Thus, when this monitored fluid pressure is reduced below the preselected high value thereof, the compressive force of spring 39 overcomes the reduced control force exerted by diaphragm 37 and is effective to move or return switch element 21 to its open position or switching mode; however, it may be noted that at the time switch element 21 is opened, switch element 19 remains closed. Even though switch element 21 is opened, relay coil 41 remains energized or picked up in its series circuit relation with closed switch element 19 and resistor 23 across battery 43 because the preselected resistance value of the resistor maintains the voltage drop across the relay coil at a value greater than the preselected dropout voltage thereof. Of course, as the monitored fluid pressure of system 17 is further reduced below the preselected low value thereof, the control force exerted by diaphragm 37 is correspondingly further reduced, and the compressive force of spring 39 is then further effective to move or return switch element 19 to its open position. The opening of switch element 23 interrupts the series circuit relation therewith of both resistor 23 and relay coil 41 across battery 43 thereby to effect the deenergization of the resistor and the relay coil causing it to dropout. Of course, the dropout of relay coil 41 effects or results in the opening of contact set 45, 47 of relay device 25 which, in turn, effects the deenergization of clutch coil 27 in clutch device 15 across battery 43. When clutch coil 27 is so deenergized, clutch device 15 is deactuated or uncoupled from its driving relation with compressor 13 thereby to interrupt its operation in system 17 and the cooling mode operation thereof. So long as enabling switch 29 remains closed, circuit 11 will effect the operation or cycling of compressor 13 between its "off" mode and its "cooling" mode when the monitored fluid pressure in system 17 again increases to at least the preselected high value thereof.

It should be noted that circuit 11 obviates the possibility of undesirable chatter of clutch device 15 which results in undue wear of the clutch device and perhaps premature failure thereof. For instance, even if the contacts associated with switch element 21 did chatter upon the making or closure thereof, the circuit to effect energization or pickup of relay coil 41 is already completed through the previous making or closure of switch element 19. Furthermore, even if the contacts associated with switch element 19 happen to chatter upon the closure thereof, switch element 19 can not effect the energization of relay coil 41 due to the voltage drop across resistor 23. Thus, it may be further noted that switch elements 19, 21 can only energize or deenergize relay coil 41, they can not do both.

With reference again to the drawings in general and recapitulating at least in part with respect to the foregoing, circuit 11 is shown in one form of the invention for controlling the operation of compressor 13 in system 17 (FIG. 1). In circuit 11, means, such as clutch device 15, is selectively energized for coupling in driving relation with compressor 13 to effect its operation in the system, and relay device 25 is picked up at a preselected pickup voltage and dropped out at a preselected dropout voltage for controlling the energization of coupling means or clutch device 15 (FIG. 1). A pair of means, such as switch elements 19, 21, connected in parallel with each other and in series with relay device 23, are operable generally sequentially for switching between a pair of conductivity modes, respectively, and relay device 25 is picked up at the preselected pickup voltage thereof to effect the energization of clutch device 15 and its driving relation with the compressor only when both switching means or switch elements 19, 21 are sequentially operated to one of the conductivity modes or closed positions thereof (FIGS. 1 and 2). Resistor means or resistor 23 is provided for connection in series circuit relation with relay device 25 and switch element 19 in its closed position and has a preselected resistance effective to obviate the pickup of the relay device at the preselected pickup voltage thereof until switch element 21 is sequentially operated to its closed position subsequent to switch element 19 (FIG. 1).

More particularly and with specific reference to FIGS. 1-3, control device 35 is provided with a pair of terminals 61, 63, and switch element 21 is connected across the terminals in parallel circuit relation with switch element 19 and resistor 23. Terminals 61, 63 of control device 35 are respectively connected by a pair of leads 65, 67 across coil 41 of relay device 25 which may be a single pole, normally open type available under model number 83053 from Gulf and Western Manufacturing Co., Farmington Hills, Mich., and when so connected with the relay device, switch element 19 is arranged in series circuit relation between resistor 23 and the relay coil while switch element 21 is arranged in parallel circuit relation with switch element 19 and the resistor and in series circuit relation with the relay coil. Contact set 45, 47 of relay device 25 are open or broken in the at-rest positions thereof and are adapted to make or close in response to the energization of relay coil 41, as previously discussed. Relay coil 41 typically picks up, i.e., is energized so as to effect the closure of contact set 45, 47 at a voltage several times that at which the relay coil drops out, i.e. becomes deenergized, to effect the opening of the contact set, and typically the pickup voltage of the relay coil is about eight (8) volts while the dropout voltage thereof is about three (3) volts. Battery 43 is interposed in lead 67, and contact 45 of relay device 25 is connected by a lead 69 with one side of clutch coil 27 while another lead 71 has one end connected with contact 47 of the relay device with the other end thereof terminating in connection with lead 67 between relay coil 41 and battery 43. The other side of clutch coil 27 is connected by another lead 73 with lead 67 between terminal 63 of control device 35 and battery 43, and to complete the description of circuit 11, on-off type enabling switch 29 is interposed in lead 73.

As illustrated in FIGS. 2 and 3, control device 35 has a housing 73 including upper and lower housing members 75, 77 which may be formed of suitable dielectric material, such as a resin or the like for instance, and the housing members are retained against displacement from each other by a metallic sleeve 79 grippingly engaged therewith. An annular disc shaped metallic washer 81 and diaphragm 37 are captured between housing members 75, 77, and the diaphragm defines with the housing members fluid pressure chamber 33 and an atmospheric or switch means accommodating chamber 83 therein, respectively. A control port 85 is provided in upper housing member 75 in pressure fluid communication with chamber 33, and the control port receives conduit 31 which is connected in system 17 with the suction side of compressor 13, as previously mentioned.

Lower housing member 77 is provided with a pair of threaded openings 87, 89 in which are received adjusting screws 91, 93, respectively, and terminals 61, 63 are disposed or otherwise positioned in switch chamber 83 of the lower housing member with electrical connector sections 61a, 63a of the terminals extending exteriorly of the lower housing member so as to be connected with leads 65, 67, respectively, in circuit 11, as best seen in FIG. 1. Switch or supporting sections 61b, 63b are integrally provided on terminals 61, 63 within switch chamber 83, and switch section 63b is arranged generally in overlaying relation with threaded opening 87 and adjusting screw 91 in lower housing member 77. Switch elements 19, 21 are of the creep or slow make and break type being formed from any suitable material having the desired resilient and electrical conductive properties, such as beryllium copper or the like for instance, and the switch elements are arranged at least in part in overlaying spaced relation having an integral end or end portion 95 interposed therebetween with a pair of free or contact carrying ends or end portions 97, 99 on the switch elements generally opposite the integral end portion thereof. Integral end portion 95 of switch elements 19, 21 is secured or otherwise connected in both mechanically supported and electrical conductive relation with switch section 61b of terminal 61 by suitable means within switch chamber 83. Another terminal or supporting member 101 is mounted on lower housing member 77 within chamber 81, and terminal 101 has a switch or supporting section 101b arranged so as to extend generally in spaced relation between switch elements 19, 21 and in elevational spaced relation, i.e. at a different spaced level, with respect to switch section 63b of terminal 63 within the chamber. Resistor 23 is provided with a pair of opposite leads 103, 105 which are secured or otherwise connected in both mechanical and electrical conductive relation with switch sections 63b, 101b of terminals 63, 101 by suitable means, such as soldering, welding or crimping or the like for instance, respectively.

A plunger 107 is guidably or slidably received in annular washer 81 extending therethrough into driven or abutting relation with a central portion or diaphragm 37 within switch chamber 83, and a spacer 109 has an upper end guidably retained by plunger 107 while the lower end of the spacer is arranged in retaining engagement with spring 39 so as to transmit thereto the control force exerted by the diaphragm, as previously mentioned. Spacer 109 extends through a pair of apertures 111, 113 provided in switch elements 19, 21, and a pair of spaced apart shoulders or abutments on the spacer abut or engage with the switch elements urging them toward switching positions away from switch sections 63b, 101b of terminals 63, 101, respectively, in response to the compressive force of spring 39 exerted on the spacer. A pair of movable contacts 115, 117 are carried on free end portions 97, 99 of switch elements 19, 21 for making with and breaking from another pair of contacts 119, 121 disposed on switch sections 63b, 101b of terminals 63, 101, respectively.

Adjuster 93 is adjustably movable in threaded opening 89 of lower housing member 77 so as to abut spacer 109 against plunger 107 in switch chamber 83 compressing spring 39 between the adjuster and the spacer. In this manner, the compressive force of spring 39 is urged against spacer 109, plunger 107 and diaphragm 37, and the spaced shoulders on the spacer are abutted with switch elements 19, 21 generally about apertures 111, 113 therein so as to bias contacts 115, 117 on free ends 97, 99 of switch elements 19, 21 toward a switching position broken from contacts 119, 121 on switch sections 63b, 101b of terminals 63, 101, respectively. Adjuster 91 is adjustably movable in threaded opening 87 of lower housing member 77 into abutment with switch section 63b of terminal 61 to effect deformation or other adjusting disposition or movement of the switch section in switch chamber 83 thereby to predetermine or preselect the spacial relation, level or elevational difference between switch sections 63b, 101b of terminals 63, 101 within the switch chamber. Of course, the adjusted elevational difference between switch sections 63b, 101b of terminals 63, 101 within switch chamber 83 and also the gradient of spring 39 defines the force at which switch element 21 is actuated.

In the operation of control device 35 when it is connected in circuit 11 and in system 17, as previously described, assume that the component parts of the control device are disposed in the respective at-rest positions thereof as illustrated in FIGS. 2 and 3. When the monitored or refrigerant fluid pressure of the preselected low value is established at control port 85, it acts on the effective area of diaphragm 37 in fluid pressure chamber 33 of upper housing member 75 to establish the control force acting against the adjusted compressive force of spring 39 and operable for effecting a slow or creep type actuation of switch elements 19, 21. Thus, as best seen in FIG. 2, diaphragm 37 is flexed or moved downwardly in response to the control force exerted thereon, and such downward movement of the diaphragm is translated therefrom through plunger 107 and spacer 109 which are conjointly movable with the diaphragm downwardly against the compressive force of spring 39. Of course, the inherent resiliency of switch elements 19, 21 effects the following or conjoint movement thereof downwardly with spacer 109, and upon this downward or pivotal movement of the switch elements about end portion 95 thereof, it may be noted that contact 115 on switch element 19 makes with contact 119 on switch section 101b of terminal 101 while contact 117 on switch blade 21 remains broken from contact 121 on switch section 63b of terminal 63. Thus, in the conductivity mode of switch element 19 with contact 115 thereon made with terminal contact 119, it may be noted that circuit 11 is completed through control device 35 from terminal 61 through switch element 19, the made contacts 115, 119, terminal 101, resistor 23 and its leads 103, 105 and therefrom to terminal 61. In this manner, when switch element 19 is made with switch section 101b of terminal 101 through contacts 115, 119 thereof, respectively, switch element 19 is placed in series circuit relation with resistor 23 across terminals 61, 63. It may then be noted that heat generated upon the energization of resistor 23 in switch chamber 83 acts to eliminate any condensation and/or frost which may have accumulated therein.

In the event of the increase of the monitored fluid pressure at control port 85 to the preselected high value, as discussed above, the control force acting on diaphragm 37 is correspondingly increased which, of course, effects the further conjoint downward movement of the diaphragm, plunger 107 and spacer 109 against the compressive force of spring 39. The resiliency of switch element 21 effects the further following or conjoint movement thereof with spacer 109 while switch element 19 remains made with switch section 101b of terminal 101 through made contacts 115, 119 thereof, respectively, and upon this further movement of switch element 21, contact 117 thereon becomes made with contact 121 on switch section 63b of terminal 63. Of course, the engagement between spacer 109 and switch element 19 is interrupted upon the further downward movement of the spacer to make switch element 21. Thus, in the conductivity mode of switch element 21 with contact 117 thereon made with terminal contact 121, it may be noted that circuit 11 is also completed through control device 35 from terminal 61 through switch element 21, the made contacts 117, 121 and terminal 63. It may also be noted that switch elements 19, 21 are sequentially made or actuated in circuit 11 in parallel circuit relation with each other, and resistor 23 remains energized in the circuit while being shunted when switch element 21 is made in circuit relation across terminals 61, 63.

When the monitored fluid pressure at control port 85 is reduced to a value less than the preselected low value thereof, the control force acting on diaphragm 37 is, of course, correspondingly reduced, and the compressive force of spring 39 returns or moves spacer 109, plunger 107 and the diaphragm conjointly upwardly toward their original or at-rest positions in control device 35. Upon this return movement in response to the compressive force of spring 39, spacer 109 initially drives switch element 21 upwardly breaking its contact 117 from terminal contact 121 thereby to interrupt circuit 11 through switch element 21 between terminals 61, 63; however, upon the breaking of switch element 21, it may be noted that switch element 19 is still made with switch section 101b of terminal 101 so that resistor 23 remains energized in the circuit across terminals 63, 101. Upon further return movement of diaphragm 37, plunger 107 and spacer 109 in response to the compressive force of spring 39 subsequent to the breaking of switch member 21 from switch section 63b of terminal 63, the spacer reengages switch element 19 to drive or move it upwardly breaking its contact 115 from terminal contact 119 thereby to interrupt circuit 11 through resistor 23 between terminals 63, 101 and effect the deenergization of the resistor. Thus, it may be noted that switch elements 19, 21 are also sequentially broken in the parallel relation thereof in circuit 11, and resistor 23 remains energized in its parallel or shunt circuit relation across terminals 61, 63 subsequent to the breaking of switch element 21 thereacross until switch element 19 is also broken from switch section 101a of terminal 101. Upon the return of the component parts of control device 35 to their respective at-rest positions, the control device may be reactuated in the same manner described above upon the reestablishment of the monitored fluid pressure at the preselected high value thereof at control port 85 of the control device.

Figure 5:
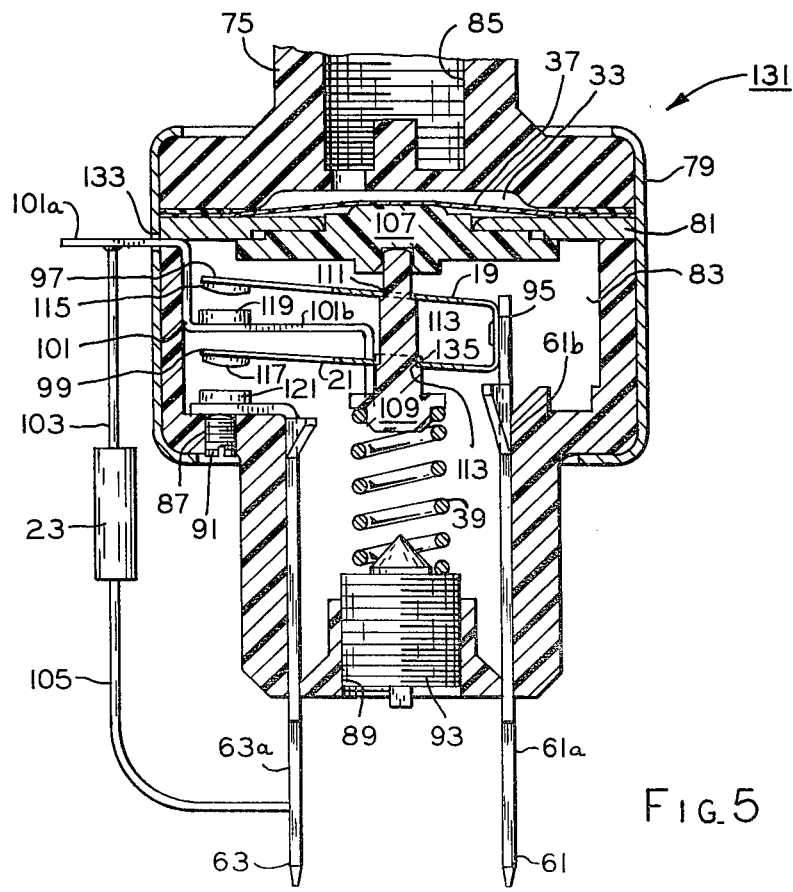
FIG. 5 is a sectional view of another exemplary control device illustrated in the electrical circuit of FIG. 4.

In FIG. 5, an alternative control device 131 is shown in one form of the invention having generally the same component parts and functioning generally in the same manner as the previously described control device 35 with the exceptions discussed hereinafter.

In control device 131, terminal 101 has an electrical connector section 101a which is extended or otherwise passed through an opening 133 provided therefor in lower housing member 77 so as to be disposed exteriorly of housing 73, and leads 103, 105 of resistor 23 are connected in electrical conductive relation with electrical connector sections 63a, 101a of terminals 61, 101, respectively, wherein the resistor is mounted to control device 131 exteriorly of housing 73 thereof.

Switch element 21 is attached by suitable means, such as for instance crimping or swagging at 135, about aperture 113 therein into displacement preventing engagement with spacer 109; however, it is contemplated that other suitable means may be employed to effect the displacement preventing engagement of switch element 21 and spacer 109.

Figure 4:
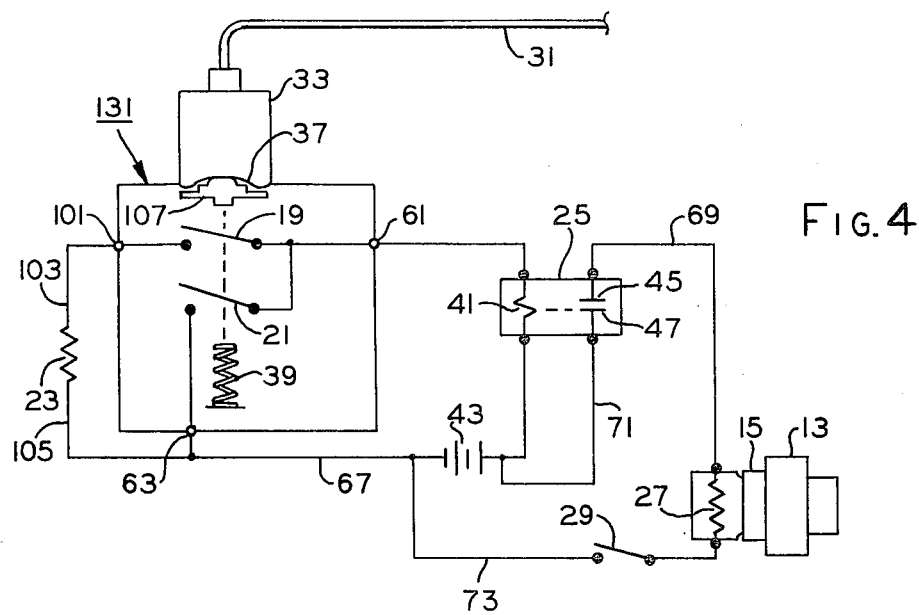
FIG. 4 is a schematic diagram showing an alternative electrical circuit in one form of the invention for controlling the compressor in the exemplary system.

In FIG. 4 control device 131 is shown connected in circuit 11, and control device 131 is operable in circuit 11 in the same manner as control device 35, as discussed hereinabove. While control devices 35, 131 are discussed herein as being operative in circuit 11 for purposes of disclosure, it is contemplated that various other control devices may be utilized in circuit 11 within the scope of the invention so as to meet at least some of the objects thereof; and, if a more detailed discussion of control devices 35, 131 are desired, reference may be had to the George E. Morris and Stewart A. Woodward application Ser. No. 349,330 filed Feb. 16, 1982 concurrently with this application, as previously mentioned and which is incorporated herein by reference.

From the foregoing, it is now apparent that a novel circuit 11 and novel method of operating such are presented meeting at least the objects and advantageous features set out hereinbefore, and it is contemplated that changes as to the precise arrangements, shapes, connections and details of the constructions illustrated herein by way of example for purposes of disclosure, as well as the precise steps and order thereof of the method, may be made by those having ordinary skill in the art without departing from the spirit of the invention or the scope thereof as defined by the claims which follow.

What I claim as new and desire to secure by Letters Patent of the United States is:

1. An electrical circuit for controlling the operation of a refrigerant compressor having a suction side and a discharge side connected in an automotive type air conditioning system comprising:
    a battery;
    a clutch device for coupling in driving relation with the compressor to effect the operation thereof in the system and including coil means adapted for energization across said battery to effect the coupling of said clutch device in the driving relation thereof with the compressor;
    a relay device including at least one set of contact means operable generally between a closed position and an open position for connecting and disconnecting said coil means across said battery, respectively, and another coil means adapted for energization across said battery to effect the operation of said at least one contact means set; and
    a control device including a pair of switch elements actuated between an open position and a closed position with said switch elements being connected in parallel with each other and in series with said another coil means of said relay device and said battery, respectively, diaphragm means subjected to fluid pressure on the suction side of the compressor and movable for actuating said switch elements, respectively, said diaphragm means being initially movable in response to the fluid pressure of a preselected value on the suction side of the compressor acting on said diaphragm means to actuate one of said switch elements to its closed position connecting said another coil means across said battery, a resistor placed in series with said another coil means upon the closure of said one switch element and having a preselected resistance value to obviate the operation of said at least one contact means set to the closed position thereof by said another coil means when it is connected across said battery upon the closure of the one switch element, said diaphragm means being thereafter further movable in response to an increase in the fluid pressure on the suction side of the compressor to another preselected value greater than the first named preselected value to actuate the other of said switch elements to its closed position energizing said another coil means across said battery in shunt relation with said resistor and said one switch element in its closed position and said at least one contact means set being operated to the closed position thereof energizing said first named coil means of said clutch device across said battery thereby to effect the coupling of said clutch device in the driving relation thereof with the compressor when said another coil means of said relay device is energized upon the closure of said other switch element, and resilient means operable generally for opposing the switch element actuating movement of said diaphragm, said resilient means being initially operable to return other switch element to its open position replacing said another coil means in series relation with said resistor and said one switch element when the fluid pressure on the suction side of said compressor acting on said diaphragm means is reduced below the another preselected value with the preselected resistance value of said resistor acting to maintain said another coil means energized across said battery upon the operation of said other switch means to its open position and said resilient means being thereafter further operable to return said one switch means to its open position to effect the deenergization of said resistor and said another coil means across said battery when the fluid pressure on the suction side of the compressor acting on said diaphragm means is reduced below the first named preselected value thereby to effect the operation of said at least one contact means set to the open position thereof interrupting the energization of said first named coil means across said battery and the coupling relation of said clutch means with the compressor.

2. An electrical circuit for controlling the operation of a refrigerant compressor of an automotive type air conditioning system comprising:
    a power source;
    a clutch device selectively energized for coupling in driving relation with the compressor;
    a relay device selectively energized at preselected pickup and dropout voltages across the power source for controlling the energization of said clutch device;

at least a pair of means operable generally sequentially for switching between a pair of conductivity modes to control the energization of said relay device, respectively;

means subjected to fluid pressure in the system for actuating said switching means, said actuating means being responsive to the system fluid pressure of a first preselected value and another preselected value in excess of the first preselected value to sequentially operate one of said switching means prior to the other of said switching means to one of the conductivity modes thereof, respectively, to effect the pickup of said relay device across said power source and thereby energize said clutch means to establish its driving relation with the compressor;

resistor means for connection in circuit relation with said relay device and said switching means and having a preselected resistance value effective to obviate the pickup of said relay device across said power source until each of said switching means is in the one conductivity mode thereof; and resilient means for sequentially returning said switching means to the other of the conductivity modes thereof as the system fluid pressure acting on said actuating means decreases below the another preselected value and the first preselected value thereof, respectively, to effect the dropout of the relay device across said power source thereby deenergizing said clutch device and interrupting its driving relation with said compressor, the preselected value of said resistor means being effective to obviate the dropout of said relay means until each of said switching means is in other conductivity mode thereof.

3. An electrical circuit as set forth in claim 2 wherein said clutch device includes coil means adapted for energization across said power source upon the pickup of said relay device to effect the driving relation of said clutch device with the compressor.

4. An electrical circuit as set forth in claim 2 wherein said relay device includes coil means adapted for energization across said power source to effect the pickup thereacross of said relay device only when both of said switching means are in the one conductivity mode thereof and also adapted for deenergization to effect the dropout of said relay device across the power source only when both of said switching means are in the other conductivity mode thereof, respectively.

5. An electrical circuit as set forth in claim 2 wherein said actuating means includes a diaphragm operatively associated with said switching means.

6. An electrical circuit as set forth in claim 2 wherein said resilient means compresses a spring associated in force transmitting relation with said actuating means.

7. An electrical circuit for controlling the operation of a refrigerant compressor of an automotive type air conditioning system comprising:

means selectively energized in the circuit for coupling in driving relation with the compressor to effect its operation in the system;

a relay device picked up at a preselected pickup voltage in the circuit and dropped out at a preselected dropout voltage for controlling the energization of said coupling means;

a pair of means connected in parallel with each other and in series with said relay device and operable generally sequentially for switching between a pair of conductivity modes, respectively, said relay means being picked up at the preselected pickup voltage thereof so as to effect the energization of said coupling means and its driving relation with the compressor only when both of said switching means are sequentially operated to one of the conductivity modes thereof; and resistor means for connection in the circuit in series with said relay device and one of said switching means in its one conductivity mode and having a preselected resistance effective to obviate the pickup of said relay device at the preselected pickup voltage thereof until the other of said switching means is sequentially operated to its one conductivity mode subsequent to said one switching means.

8. A method of controlling an electrical circuit to effect the operation of a refrigerant compressor in an automotive type air conditioning system and with the circuit having a battery, a pair of switch elements, a resistor having a preselected resistance value, a clutch device for coupling in driving relation with the compressor and including a first coil, and a relay device including a second coil having a preselected pickup voltage and a preselected dropout voltage, and a set of contacts, the method comprising the steps of:

closing one of the switch elements prior to the other of the switch elements;

placing the resistor in series circuit relation with the second coil across the battery with the preselected resistance value of the resistor being effective to maintain the voltage drop across the second coil to a value less than the preselected pickup voltage of the second coil;

closing the other switch element and placing thereby the resistor in shunt circuit relation with the second coil;

energizing the second coil across the battery when the resistor is placed in the shunt circuit relation with the second coil and closing the contact set in response to the energization of the second coil;

energizing the first coil across the battery upon the closure of the contact set and effecting thereby the coupling of the clutch device in the driving relation thereof with the compressor to initiate its operation in the system;

opening the other switch element prior to the one switch element;

interrupting the shunt circuit relation of the resistor with the second coil across the battery upon the opening of the other switch element and replacing the resistor in the series circuit relation thereof with the second coil through the closed one switch element across the battery with the preselected resistance value of the resistor being effective to maintain the voltage drop across the second coil to a value greater than the preselected dropout value of the second coil;

opening the one switch element and interrupting the series circuit relation of the resistor and the second coil across the battery thereby to deenergize the resistor and the second coil;

opening the contact set upon the deenergization of the second coil and deenergizing thereby the first coil across the battery; and uncoupling the clutch device from its driving relation with the compressor upon the deenergization of the first coil and interrupting thereby the operation of the compressor in the system.

9. A method of controlling an electrical circuit to effect the operation of a refrigerant compressor associated with a clutch device adapted for coupling in driving relation therewith in an automotive type air conditioning system, the circuit including a pair of means for switching between a pair of conductivity modes, respectively, a resistor, a relay device, and coil means energizable for actuating the clutch device, the method comprising the steps of:

monitoring the fluid pressure of refrigerant in the system;

effecting sequential operation of the switching means to one of the conductivity modes thereof in response to the monitored refrigerant fluid pressure of different preselected values, respectively, and placing the resistor in circuit relation with the relay device upon the operation of one of the switching means to its one conductivity mode to obviate the actuation of the relay device until the other of the switching means is sequentially operated to its one conductivity mode; and energizing the coil means upon the actuation of the relay device when the other switching means is sequentially operated to its one conductivity mode and coupling the clutch device in the driving relation with the compressor so as to initiate its operation thereof in the system in response to the energization of the coil means.

10. The method as set forth in claim 9 comprising the additional step of effecting the sequential operation of the switching means to the other of the conductivity modes thereof when the monitored refrigerant fluid pressure falls below the different preselected values thereof, respectively, and replacing the resistor in its circuit relation with the relay device upon the operation of the ther switching means to its other conductivity mode to obviate the deactuation of the relay device until the one switching means is sequentially operated to its other conductivity mode.

11. The method as set forth in claim 10 comprising the additional step of deenergizing the coil means upon the deactuation of the relay device when the one switching is sequentially operated to its other conductivity mode and uncoupling the clutch device from its driving relation with the compressor so as to terminate its operation in the system when the coil means is deenergized.

12. The method as set forth in claim 10 comprising the preliminary step of selecting a preselected resistance value of the resistor and matching it with a preselected pickup voltage and a preselected dropout voltage chosen for the relay device thereby to maintain the voltage drop across the relay device at a value less than the preselected pickup voltage when the resistor is placed in the circuit relation thereof with the relay during the effecting and placing step and also to maintain the voltage drop across the relay device to a value greater than the preselected dropout value when the resistor is replaced in the circuit relation thereof with the relay device during the effecting and replacing step.

13. The method as set forth in claim 9 wherein the effecting and placing step includes connecting the resistor in series in the circuit relation thereof with the relay device upon the operation of the one switching means to its one conductivity mode and shunting the resistor in the circuit relation thereof with the relay device upon the sequential operation of the other switching means to its one conductivity mode.

14. A method of controlling an electrical circuit to effect the operation of a refrigerant compressor associated with a clutch device adapted for coupling in driving relation therewith in an automotive type air conditioning system, the circuit including a power source, a pair of switch means for operation between a pair of switching modes thereof, respectively, a resistor having a preselected resistance value, a relay device having a preselected pickup voltage and a preselected dropout voltage, and coil means energizable for actuating the clutch device, the method comprising the steps of:

operating the switch means sequentially to one of the switching modes thereof, respectively, and connecting the resistor in circuit relation with the relay across the power source upon the operation of one of the switch means to its one switching mode with the preselected resistance value of the resistor being effective to maintain the voltage drop across the relay device to a value less than the preselected pickup voltage of the relay device until the sequential operation of the other of the switch means to its one switching mode; and actuating the relay device generally at the pickup voltage thereof in response to the operation of the other switch means to its one switching mode and energizing thereby the coil means to effect the coupling of the clutch device in the driving relation thereof with the compressor and initiate its operation in the system.

* * * * *